United States Patent
Feraud et al.

(10) Patent No.: US 10,816,060 B2
(45) Date of Patent: Oct. 27, 2020

(54) REDUCTION GEAR WITH INPUT/OUTPUT ROTATION REVERSAL

(71) Applicant: SAFRAN TRANSMISSION SYSTEMS, Colombes (FR)

(72) Inventors: Benjamin Feraud, Moissy-Cramayel (FR); Aldric Renaud Gabriel Marie Moreau De Lizoreux, Moissy-Cramayel (FR); Boris Morelli, Moissy-Cramayel (FR); Maxime Amiet, Moissy-Cramayel (FR); Antoine Mathieu, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 36 days.

(21) Appl. No.: 15/998,612

(22) PCT Filed: Feb. 15, 2017

(86) PCT No.: PCT/FR2017/050343
§ 371 (c)(1),
(2) Date: Aug. 16, 2018

(87) PCT Pub. No.: WO2017/140981
PCT Pub. Date: Aug. 24, 2017

(65) Prior Publication Data
US 2019/0234490 A1 Aug. 1, 2019

(30) Foreign Application Priority Data
Feb. 16, 2016 (FR) ...................................... 16 51245

(51) Int. Cl.
*F16H 1/22* (2006.01)
*B64D 35/06* (2006.01)
*F16H 3/02* (2006.01)

(52) U.S. Cl.
CPC ............... *F16H 1/22* (2013.01); *B64D 35/06* (2013.01); *F16H 3/02* (2013.01)

(58) Field of Classification Search
CPC .......... F16H 1/22; F16H 37/065; F16H 37/06; B64C 27/12
See application file for complete search history.

(56) References Cited

U.S. PATENT DOCUMENTS 3,396,594 A * 8/1968 Walker .................... F16H 57/12
74/409
4,153,002 A * 5/1979 Sigg ........................ B63H 23/10
440/3

(Continued)

FOREIGN PATENT DOCUMENTS

| EP | 0 172 104 A1 | 2/1986 |
| FR | 2 355 713 A1 | 1/1978 |

(Continued)

OTHER PUBLICATIONS

International Search Report dated May 15, 2017, in PCT/FR2017/050343 filed Feb. 15, 2017.

(Continued)

*Primary Examiner* — Randell J Krug
(74) *Attorney, Agent, or Firm* — Oblon, McClelland, Maier & Neustadt, L.L.P.

(57) ABSTRACT

A reduction gear including an input shaft including an input gear, an output shaft including an output gear, and two intermediate transmission lines, each intermediate transmission line including an intermediate shaft including a first stage of teeth and a second stage of teeth, the stages rotating as one, and an additional gear for meshing respectively with the first stage of teeth and the input gear, or with the second stage of teeth and the output gear, and the reduction gear wherein the input gear or the output gear meshing with the (Continued)

additional gears is axially offset with respect to the stage of teeth of the intermediate shafts meshing with the additional gears.

18 Claims, 6 Drawing Sheets

(56) References Cited

U.S. PATENT DOCUMENTS

| | | | |
|---|---|---|---|
| 4,643,039 A | | 2/1987 | Guichard |
| 4,811,627 A | | 3/1989 | Mouille |
| 5,528,960 A | | 6/1996 | Nagao et al. |
| 5,588,328 A | * | 12/1996 | Nihei .................. F16H 1/22 74/409 |
| 6,264,138 B1 | | 7/2001 | Hawkins |
| 6,364,611 B1 | * | 4/2002 | Matsuda .............. B64C 27/14 416/170 R |
| 2005/0011307 A1 | | 1/2005 | Gmirya |
| 2007/0219044 A1 | | 9/2007 | Waide |
| 2011/0296947 A1 | | 12/2011 | Gmirya |
| 2013/0160605 A1 | | 6/2013 | Gmirya |
| 2015/0060596 A1 | | 3/2015 | Garcia |
| 2016/0152342 A1 | | 6/2016 | Garcia |

FOREIGN PATENT DOCUMENTS

| | | |
|---|---|---|
| FR | 2 561 341 A1 | 9/1985 |
| WO | WO 00/17540 A2 | 3/2000 |
| WO | WO 2011/124603 A1 | 10/2011 |
| WO | WO 2015/034732 A1 | 3/2015 |

OTHER PUBLICATIONS

French Preliminary Search Report dated Oct. 6, 2016 in Patent Application No. FR 1651245 (with English translation of categories of cited documents), 3 pages.

International Search Report dated May 15, 2017 in PCT/FR2017/050343 (with English translation of categories of cited documents), (English translation previously filed), 6 pages.

* cited by examiner

REDUCTION GEAR WITH INPUT/OUTPUT ROTATION REVERSAL

FIELD OF THE INVENTION

The invention relates to a speed reducer comprising an input shaft, an output shaft, and two intermediate shafts transmitting a torque from the input shaft to the output shaft.

The invention applies in particular to propeller speed reducers of turbomachines, of the turboprop type for example.

PRIOR ART

There exist aircraft propelled by sets of several turboprops, i.e. turbomachines comprising a rotating shaft driven in rotation by an assembly comprising a compressor and a turbine, and a propeller which is driven in rotation by this rotating shaft through a speed reducer or PGB for power gearbox.

For this type of aircraft in particular, it can be very advantageous for aerodynamic reasons that certain propellers turn in one direction and that other propellers turn in the opposite direction. This involves, when employing one turboprop per propeller, the turboprops being identical for all the propellers, inverting the rotation of certain propellers at the speed reducer with respect to their respective turboprops.

In this regard, one type of speed reducer provided with a reversal system is known.

Figure 1A:
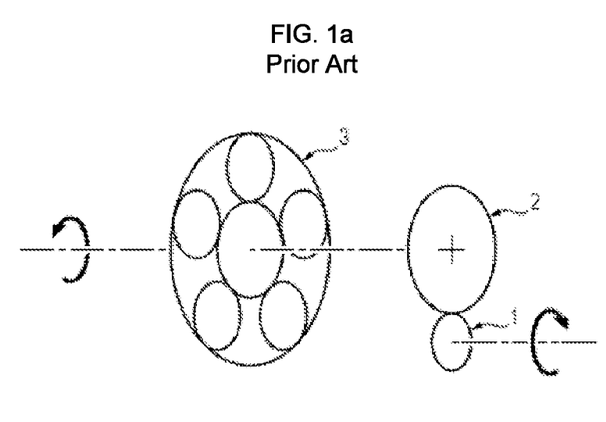
FIGS. 1a and 1b, already described, illustrate a speed reducer of the prior art respectively without and with reversal of the direction of rotation between the input shaft and the output shaft.

FIG. 1a shows one known type of speed reducer not having a reversal system. This speed reducer includes a first reduction stage formed by an input shaft carrying a gear 1 and meshing with a gear 2 of an intermediate shaft, and a second reduction stage formed by a planetary gearset 3, of which the sun gear rotates as one with the intermediate shaft, and the satellite carrier is the output shaft.

Figure 1B:
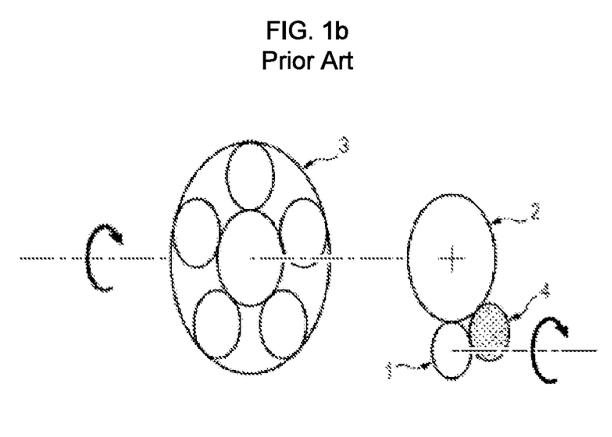

The reversal of the direction of rotation between the input shaft and the output shaft is obtained by interposing an additional gear 4 between the gear 1 of the input shaft and the gear 2 of the intermediate shaft (FIG. 1b). The additional gear 4 allows inverting the direction of rotation of the gear of the intermediate shaft, and consequently that of the output shaft.

This speed reducer nevertheless has the disadvantage that it includes only a single torque transmission line, which makes it rather bulky since the gears must be dimensioned to transmit all the necessary torque from the input shaft to the output shaft.

Another known type of speed reducer is a speed reducer of the compound type. This speed reducer includes two intermediate transmission lines between the input shaft and the output shaft, each meshing with the input gear of the input shaft and the output gear of the output shaft.

This other architecture brings the advantage of a reduction in bulk because the torque transmitted by the input shaft is distributed between the two intermediate lines and the gears can therefore be of smaller size. However, this architecture has the disadvantage of not allowing reversal of the direction of rotation between the input gear and the output gear.

In this regard, compound speed reducers are known from documents WO 2015/034732 and FR 2355713, configured to reverse the direction of rotation between the input gear and the output gear. However, the architecture of such speed reducers causes considerable bulk.

PRESENTATION OF THE INVENTION

One aim of the invention is to correct, at least in part, the disadvantages of the prior art.

In particular, one aim of the invention is to propose a speed reducer which makes it possible to reverse the direction of rotation between the input gear and the output gear.

Another aim of the invention is to propose several variants while limiting as much as possible the number of different parts from one version to another so as to limit the costs of production.

Another aim of the invention is to retain the reduction ratio of the speed reducer independently of the reversal of the direction of rotation between the input shaft and the output shaft.

Another aim of the invention is to propose a speed reducer comprising a homogenous distribution of stress.

In this regard, the invention has as its object a speed reducer, comprising
- an input shaft, comprising an input gear,
- an output shaft, comprising an output gear, and
- two intermediate transmission lines, each intermediate transmission line comprising:
  - an intermediate shaft comprising a first stage of teeth and a second stage of teeth, said stages being secured for rotation, and
  - an additional gear, fit for meshing with, respectively, the first stage of teeth and the input gear, or with the second stage of teeth and the output gear, and the speed reducer being characterized in that the input or output gear meshing with the additional gears is offset axially with respect to the stage of teeth of the intermediate shafts meshing with said additional gears.

Advantageously but optionally, the speed reducer according to the invention can also comprise at least one of the following features:
- the input or output gear meshing with the additional gears is mounted on the respective shaft with a variable axial position.
- a stage of teeth of the intermediate shafts meshing with an additional gear has an axial position strictly comprised between the axial positions of the input gear and of the output gear.
- the input gear or the output gear meshing with the additional gears has an axial position strictly comprised between the axial positions of the two stages of teeth of the two intermediate shafts.
- the additional gears mesh with the input gear and the first stage of teeth of each intermediate shaft, and the additional gears are disposed:
  - at two diametrically opposite positions with respect to the axis of rotation of the input gear, or
  - at two symmetrical positions with respect to a plane orthogonal to the plane formed by the axes of rotation of the intermediate shafts, at equal distance therefrom.
- the additional gears mesh with the output gear and the second stage of teeth of each intermediate shaft, and the additional gears are disposed at two symmetric positions with respect to a plane orthogonal to the plane formed by the axes of rotation of the intermediate shafts, at equal distance therefrom, and
  - between the intermediate shafts, or
  - on either side of the intermediate shafts.

The invention also has as its object a turbomachine, comprising a speed reducer according to the preceding description.

The speed reducer according to the invention includes two intermediate torque transmission lines, which mesh with the input gear of the input shaft and the output gear of the output shaft, and allow the reversal of the direction of rotation between the input shaft and the output shaft by being made in two portions capable of meshing. Thus the proposed speed reducer has the advantages of a compound speed reducer of the prior art in terms of bulk, while allowing a reversal of the direction of rotation between the input shaft and the output shaft.

In particular, the intermediate transmission lines can each comprise a shaft including a first and a second stage of teeth mounted to rotate as one, and an additional gear interleaved between the shaft and the input gear or the output gear.

The possibility of axially offsetting the input gear or the output gear, possibly by interleaving between the axial positions of the stages of teeth of the intermediate shafts, also allows limiting the bulk of the speed reducer. Bulk is also limited when the input or output gear, the additional gears and the corresponding teeth of the intermediate shafts are coplanar.

In addition, the use of an input or output shaft on which the gear is mounted with a variable axial position allows the same parts to be manufactured to construct different variants of the speed reducer by displacing only the position of the gear. This allows a reduction of the costs of manufacture of the speed reducer, for example in the case where the reversed and non-reversed variants of the same reduction drive are mounted on the same aircraft.

Finally, the positions of the additional gears can be adapted to distribute as well as possible the stress in the speed reducer. In particular a good distribution of stress is obtained for diametrically opposite positions of these gears relative to the input gear, when the additional gears mesh with it.

DESCRIPTION OF THE FIGURES

Other features, aims and advantages of the invention will be revealed by the description that follows, which is purely illustrative and not limiting, and which must be read with reference to the appended drawings in which.

DETAILED DESCRIPTION OF AT LEAST ONE EMBODIMENT OF THE INVENTION

With reference to FIGS. 2a to 3c, a speed reducer 10 will now be describe which can typically be used in a turbomachine, particularly in a turboprop, between the engine shaft and the propeller shaft of an aircraft (the speed reducer can be called PGB or power gearbox).

The speed reducer 10 comprises an input shaft 11, typically secured for rotation with an engine shaft of the turbomachine. The input shaft 11 is provided with a gear called an input gear 110. As will be seen subsequently, the gear 110 can be located at one end of the input shaft 11 or in the vicinity of the end.

The speed reducer 10 also comprises an output gear 12, typically secured for rotation with a propeller shaft. The output shaft 12 is provided with a gear, called an output gear 120, which can also be positioned at one end of the shaft or in the vicinity of this end.

The speed reducer 10 also comprises two intermediate lines 15 for transmitting torque between the input gear 110 of the input shaft 11 and the output gear 120 of the output shaft 12.

In this regard, each intermediate line includes a first gear meshing with the input gear 110 and a second gear meshing with the output gear 120.

Thus the input shaft 11 transmits to both intermediate lines 15 a total torque distributed between the two lines of the speed reducer 10. The torque is then transmitted to the intermediate lines of the output shaft 12.

Moreover, to allow a reversal of the direction of rotation between the input gear and the output gear, each intermediate line includes two portions which can mesh with each other.

According to a preferred embodiment, each intermediate transmission line 15 includes an intermediate shaft 13, and an additional gear 14 interleaved between the shaft 13 and the input gear 110 or the output gear 120.

The intermediate shafts 13 of the two lines 15 extend along respective mutually parallel axes of rotation. The axes of rotation of the intermediate shafts are also parallel to the axes of rotation of the input shaft 11 and of the output shaft 12, which are typically congruent with an axis denoted X-X in the figures.

Each intermediate shaft 13 comprises a first stage of teeth 130, and a second stage of teeth 131, the two stages of teeth being preferably positioned at the end of each intermediate shaft 13 and secured for rotation. For example, the two stages of teeth can be integral with a rod extending between them.

The speed reducer 10 thus comprises two transmission shafts 13 and two additional gears 14, which are interposed respectively between each intermediate shaft 13 and the output shaft 12 or the input shaft 11.

Thus for each intermediate transmission line 15, the first gear meshing with the input gear can be the first stage of teeth 130 of the shaft 13, or the additional gear 14, and the second gear engaging with the output gear 120 is respectively the additional gear 14 or the second stage of teeth 131.

In this manner, the speed reducer includes two parallel lines each composed of the input gear 110, an intermediate shaft 13, an additional gear 14 and of the output gear 120, and comprising three successive gear stages, which causes a reversal of the direction of rotation of the output shaft 12 with respect to the input shaft 11. This reversal of the direction of rotation originates in the fact that each exterior gearing stage (which is the case for all gearing composing the speed reducer) reverses the direction of rotation between the gears that constitute it.

The tooth shapes of the different gears are arbitrary: they can be straight, helical, etc.

Positioning Variants of the Additional Gears

According to a first embodiment, of which variants are shown in FIGS. 2a to 2e, each additional gear 14 is interposed between the input gear 110 and the first stage of teeth 130 of each intermediate shaft. In other words, each additional gear 14 meshes with the input gear 110 on the one hand, and with the first stage of teeth 130 of a respective intermediate shaft 13 on the other hand.

The additional gears 14 can have two different configurations relative to the input gear 110.

According to a preferred configuration shown in FIGS. 2a, 2b, 2c and 2e, the additional gears 14 have diametrically opposite positions with respect to the axis X-X of rotation of the input gear 110. This allows an optimal distribution of stress transmitted by the input gear to the additional gears.

Figure 2A:
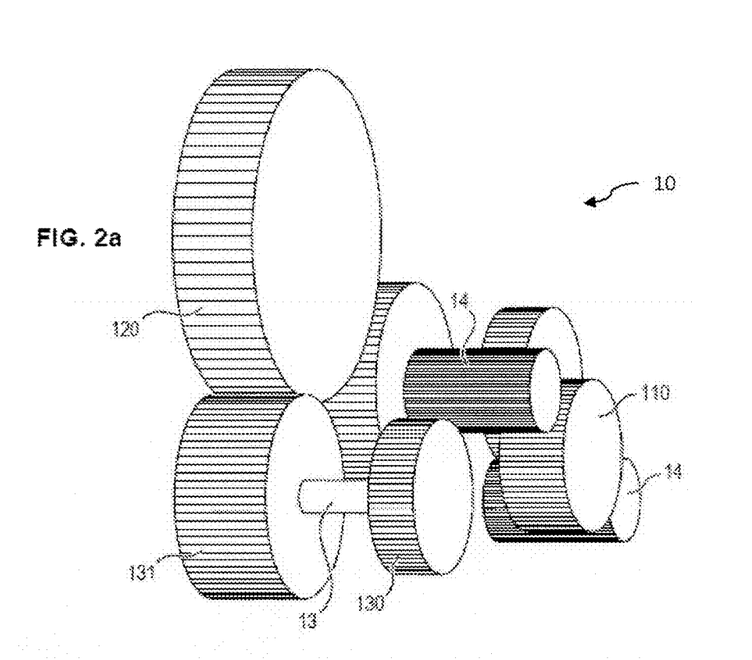
FIGS. 2a to 2e show schematically variant embodiments of a speed reducer comprising intermediate transmission lines in two portions, each including an intermediate shaft and an intermediate gear interleaved between the input gear and the intermediate shaft.
Figure 2B:
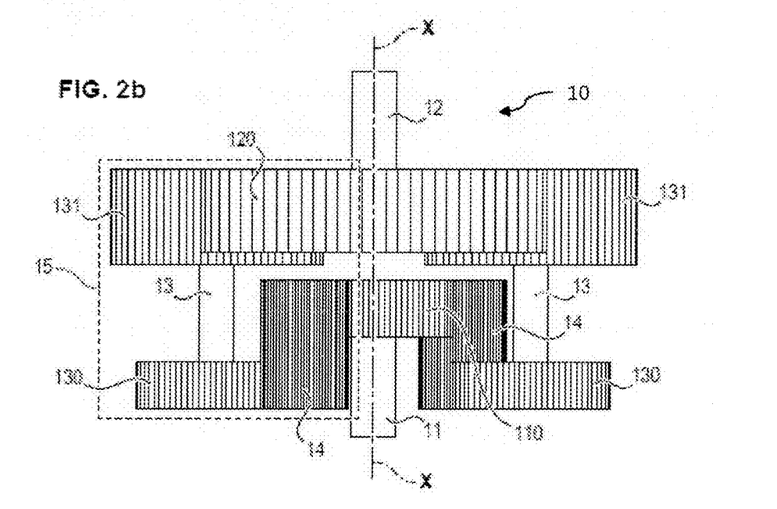
Figure 2C:
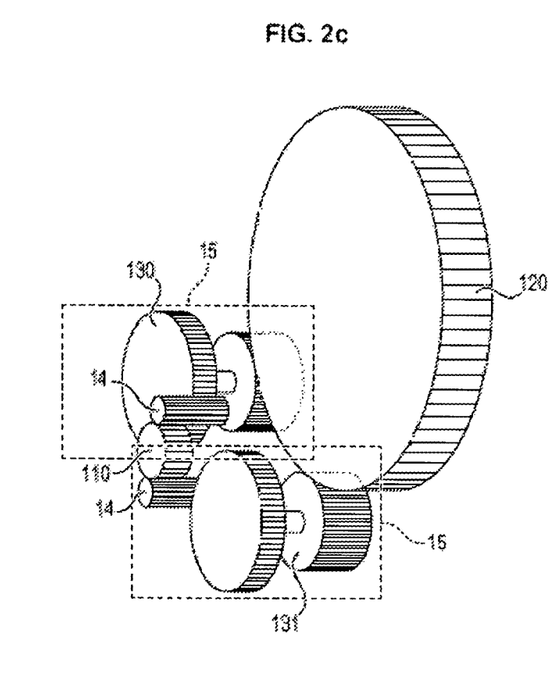
Figure 2D:
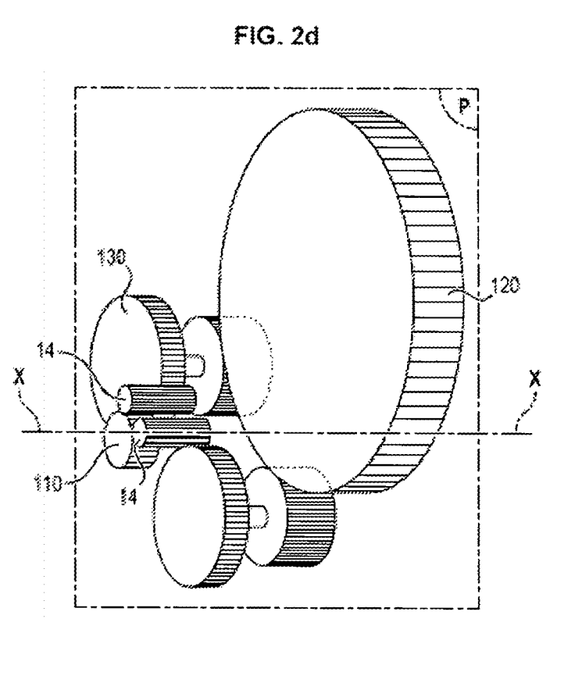

According to one configuration variant shown in FIG. 2d, the additional gears can have symmetrical positions with respect to a plane P orthogonal to the plane in which are positioned the axes of rotation of the intermediate shafts 13. The axis X-X is positioned in the plane P.

Figure 3A:
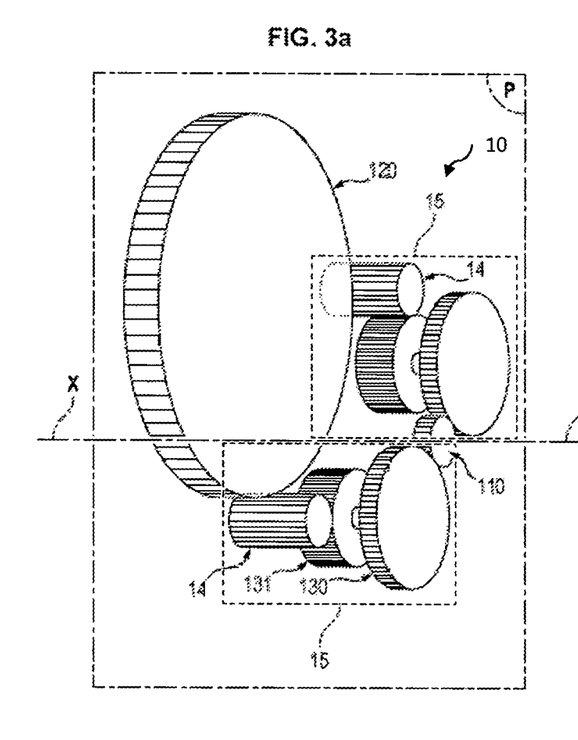
FIGS. 3a to 3c show schematically variant embodiments of a speed reducer comprising intermediate transmission lines in two portions, each comprising an intermediate shaft and an additional gear interleaved between the output gear and the intermediate shaft.
Figure 3B:
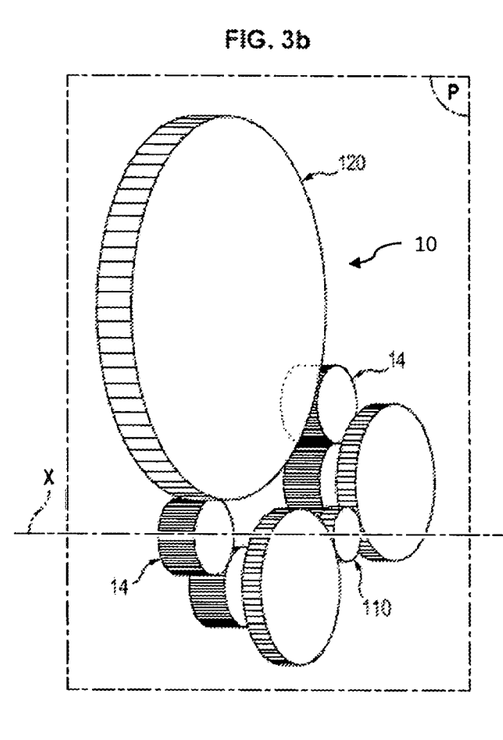
Figure 3C:
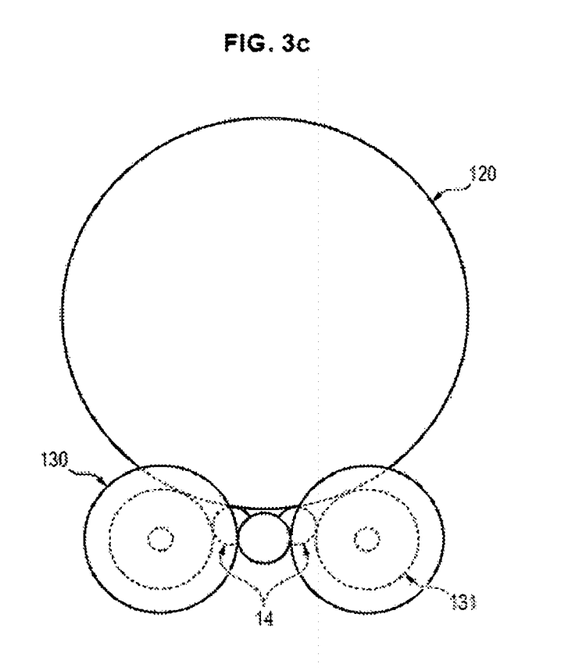

According to a second embodiment, of which variants are shown in FIGS. 3a to 3c, each additional gear 14 is interposed between the second stage of teeth 131 of a respective intermediate shaft and the output gear 120. In other words, each additional gear 14 meshes on the one hand with the second stage of teeth 131 of a respective intermediate shaft and meshes, on the other hand, with the output gear 120.

In this embodiment, the additional gears can also have two different configurations relative to the output gear 120.

According to a first configuration shown in FIGS. 3a and 3b, the additional gears 14 are disposed in two symmetrical positions with respect to the plane P defined earlier, on either side of the stages of teeth 131 of the intermediate shafts 13. In other words, the distance between the axis of rotation of each additional gear 14 and the plane P is greater than the distance between the axis of rotation of each intermediate shaft and the plane P.

According to one configuration variant shown in FIG. 3c, the additional gears 14 are disposed in two symmetrical positions with respect to the plane P defined earlier, by being positioned between the intermediate shafts 13. In other words, the distance between the axis of rotation of each additional gear 14 and the plane P is less than the distance between the axis of rotation of each intermediate shaft and the plane P.

Free Rotation of the Input or Output Dear with Respect to the Intermediate Shaft Regardless of the embodiment employed among the two embodiments introduced earlier, the input 110 or output 120 gear which meshes with the additional gears 14 must be adapted so as not to mesh with the corresponding stage of teeth of the intermediate shaft 13, i.e. to pivot freely with respect to this stage of teeth. To this end, several variants can be implemented.

Axial Offset of the Input/Output Gear

A first possibility so that the input 110 or output 120 gear does not mesh with the respective teeth 130, 131 of the intermediate shafts 13 is to offset it axially with respect to these teeth, i.e. to confer on it an axial position on the axis X-X i.e. different from that of the teeth.

Thus, for the case where the additional gears 14 are interposed between the input gear 110 and the first stage of teeth 130, the input gear 110 can be offset axially with respect to the first stage of teeth 130, as is the case in FIGS. 2a to 2d. In this case, each additional gear extends axially from the input gear 110 at this stage of teeth 130 in order to be able to mesh with both.

In the case where the additional gears 14 are interposed between the output gear 120 and the second stage of teeth 131, the output gear 120 can be offset axially with respect to the second stage of teeth 131, as is the case in FIGS. 3a and 3c. In this case, each additional gear 14 extends axially from the second stage of teeth 131 of the respect intermediate shaft 13 to the output gear 120 in order to be able to mesh with both.

For its part, the offset can be implemented in several manners.

According to a first manner, the stage of teeth of the intermediate shaft 13 meshing with the additional gears 14 can have an axial position along the axis X-X strictly comprised between the axial positions of the input 110 and output 120 gears, which is obtained by offsetting respectively the input gear 110 upstream or the output gear 120 downstream. Hereafter, the notions of upstream and downstream are defined with respect to the direction of torque transmission: upstream is on the side of the input shaft and downstream is on the side of the output shaft.

This variant, applied to the first embodiment in which the additional gears 14 mesh with the input gear 110 and the first stages of teeth 130 of the intermediate shafts, is the following: the input gear is offset axially upstream with respect to the first stage of teeth 130, i.e. it is farther away from the axial position of the output gear 120 than said stage 130. As a result, the first stage 130 of the intermediate shafts 13 is located at an axial position strictly comprised between that of the input gear 110 and that of the output gear 120, as can be seen in FIGS. 2a, 2c and 2d.

This same variant, applied to the second embodiment in which the additional gears 14 mesh with the output gear 120 and the second stages of teeth 131 of the intermediate shafts 30, is the following: the output gear 120 is offset axially downstream, i.e. it is farther away from the axial position of the input gear 110 than the stage 131. As a result, the second stages of teeth 131 of the intermediate shafts 13 is located at an axial position strictly comprised between that of the output gear 120 and that of the input gear 110, as can be seen in FIG. 3a.

According to a second variant, either the input gear 110 or the output gear 120, meshing with the additional gears 14, can have an axial position strictly comprised between the axial positions of the two stages of teeth 130, 131 of the intermediate shafts 13.

This variant applied to the first embodiment is the following: the input gear 110 is offset axially downstream, i.e. toward the output shaft 12, so as to have an axial position strictly between the two stages of teeth 130, 131 of the intermediate shafts 13, as is the case in FIG. 2b.

This same variant applied to the second embodiment is the following: the output gear is offset axially upstream, i.e. toward the input shaft 11, so as to have an axial position comprised strictly between the two stages of teeth 130, 131 of the intermediate shafts 13 (variant not shown).

In all cases of offsetting the input 110 or output 120 gear, it can be advantageous that the input 110 or output 120 gear be mounted to its respective shaft, input or output, by being able to adopt a variable axial position to it.

This makes it possible, by using the same shafts and the same gears, to be able to position the gear at different axial positions on a shaft, and therefore to be able to implement different variants of the speed reducer 10. Thus it is not necessary to produce different parts for speed reducers with and without reversal, designed to be mounted on the same aircraft to confer on it two different directions of rotation of the propellers, and the cost of manufacture of the parts is thereby reduced.

In this case, it will be possible to configure input or output shafts to a length such that their end is located at an axial position disposed between the axial positions of the stages of teeth of the intermediate shaft, and position, if necessary, the input or output gear either at the end of the respective shaft, or before the end, in the case where the input gear is offset upstream—respectively the downstream gear is offset downstream.

Coplanar Positions of the Input/Output Gears with the Teeth of the Intermediate Shafts With reference for example to FIG. 3b, a second possibility for the input 110 or output 120 gear not to mesh with the respective teeth 130, 131 of the intermediate shafts 13 is to retain it in the same plane as these teeth, but adapting the gear and the stage of teeth so that they do not mesh.

To this end, a first variant embodiment is to adapt the diameter of the input gear 110 or of the output gear 120 meshing with the reversal gears, by adapting the number of teeth of this gear. The number of teeth of the stage of teeth of the intermediate shafts 13 meshing with the reversal gears can be adapted in the same manner to retain a desired reduction ratio.

For example, due to the bulk resulting from the additional gears 14, the number of teeth of the input and output gears can be reduced with respect to a configuration of the speed reducer without reversal gears, and the number of teeth of the corresponding stage of teeth can be reduced in the same proportion.

A second variant embodiment consists of adapting the modulus of the input gear or the output gear 120 meshing with the additional gears 14, and to adapt in the same manner the modulus of the stage of teeth of the intermediate shafts 13 meshing with these gears. This variant has the advantage of retaining a rigorously identical reduction ratio with respect to an equivalent speed reducer without reversal gears.

As will have been understood, the following main features are combinable with one another, independently of the variant embodiments which are implemented:
- The reduction stage where the additional gears are interleaved (i.e. between the input gear and the intermediate shafts or between the intermediate shafts and the output gear), and
- The way the input or output gear is adapted to be free in rotation with the corresponding stage of teeth.

Particularly FIGS. 2a to 3c illustrate a few examples of combinations of variant embodiments which are summarized below.

FIGS. 2a and 2c illustrate an example in which the additional gears 14 are interposed between the input gear 110 and the first stage of teeth 130 of the intermediate shafts 13. The additional gears 14 are disposed at diametrically opposite positions with respect to the input gear 110. The input gear is offset upstream so as not to mesh with the first stage of teeth 130 of the intermediate shafts 13.

FIG. 2b illustrates an example in which the additional gears 14 are interposed between the input gear 110 and the first stage of teeth 130 of the intermediate shafts 13. The additional gears 14 are disposed at diametrically opposite positions with respect to the input gear 110. The input gear is offset downstream so as not to mesh with the first stage of teeth 130 of the intermediate shafts 13.

FIG. 2d illustrates an example in which the additional gears 14 are interposed between the input gear 110 and the first stage of teeth 130 of the intermediate shafts 13. The additional gears 14 are disposed at symmetrical positions with respect to the plane P. The input gear is offset upstream so as not to mesh with the first stage of teeth 130 of the intermediate shafts 13.

Figure 2E:
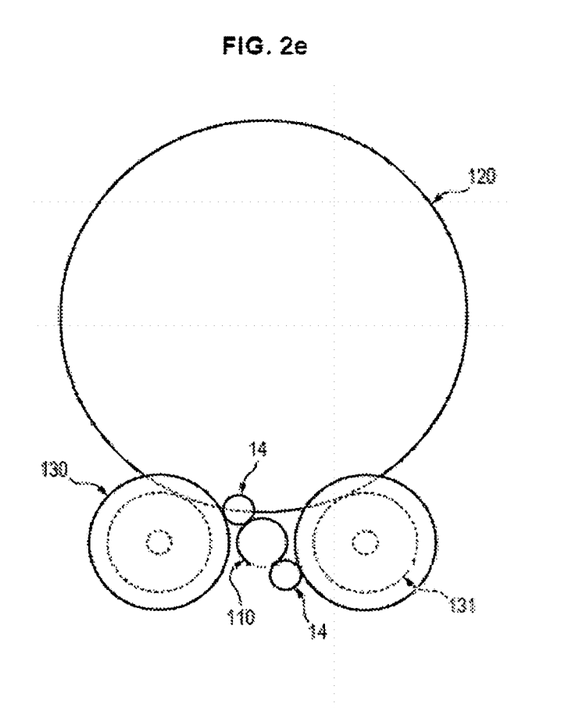

FIG. 2e illustrates an example in which the additional gears 14 are interposed between the input gear 110 and the first stage of teeth 130 of the intermediate shafts 13. The additional gears 14 are disposed at diametrically opposite positions with respect to the input gear 110. The input gear and the first stage of teeth 130 of the intermediate shafts 13 are coplanar and adapted so as not to mesh.

FIG. 3a illustrates an example in which the additional gears 14 are interposed between the second stage of teeth 131 of the intermediate shafts and the output gear 120. The additional gears 14 are disposed on either side of said stages 131. The output gear is offset axially downstream so as not to mesh with said stages 131.

FIG. 3b illustrates an example in which the additional gears 14 are interposed between the second stage of teeth 131 of the intermediate shafts and the output gear 120. The reversal gears 14 are disposed on either said of said stages 131. The output gear and the second stage of teeth 131 of the intermediate shafts 13 are coplanar and adapted so as not to mesh.

FIG. 3c illustrates an example in which the additional gears 14 are interposed between the second stage of teeth 131 of the intermediate shafts and the output gear 120. The additional gears 14 are disposed between said stages 131. The output gear is offset axially (upstream or downstream) so as not to mesh with said stages 131.

A variant, equivalent to the embodiment presented above in which each transmission line 15 comprises a shaft 13 provided with two stages of teeth and an additional gear 14, consists of replacing the shaft 13 by a shorter shaft, and the additional gear by a second shaft also provided with two stages of teeth, of which one stage plays the role of the gear 14 and the other meshes with the first shaft. This variant is not shown.

The invention claimed is:

1. A speed reducer, comprising:
   an input shaft comprising an input gear;
   an output shaft comprising an output gear; and
   a first intermediate transmission line comprising:
      a first intermediate shaft comprising a first stage of teeth and a second stage of teeth, the first stage of teeth and the second stage of teeth being secured for rotation, and
      a first additional gear meshing with the first stage of teeth and the input gear, or with the second stage of teeth and the output gear and
   a second intermediate transmission line comprising:
      a second intermediate shaft comprising a third stage of teeth and a fourth stage of teeth, the third stage of teeth and the fourth stage of teeth being secured for rotation, and
      a second additional gear meshing with the third stage of teeth and the input gear, or with the fourth stage of teeth and the output gear,
   wherein the input gear or the output gear meshing with the first additional gear and the second additional gear is offset axially with respect to, respectively, the first stage of teeth and the third stage of teeth, or with respect to the second stage of teeth and the fourth stage of teeth, and wherein the input gear or the output gear meshing with the first additional near and the second additional near is mounted on, respectively, the input shaft or the output shaft with a variable axial position.

2. The speed reducer according to claim 1, wherein the first stage of teeth or the second stage of teeth that mesh with the first additional gear has an axial position strictly located between axial positions of the input gear and the output gear.

3. The speed reducer according to claim 1, wherein the input gear or the output gear that meshes with the first additional gear and the second additional gear has an axial position strictly located between axial positions of the first stage of teeth and the second stage of teeth.

4. The speed reducer according to claim 1, wherein the first additional gear meshes with the input gear and the first stage of teeth, the second additional gear meshes with the input gear and the third stage of teeth, and the first additional gear and the second additional gear are disposed at two diametrically opposite positions with respect to an axis of rotation of the input gear.

5. The speed reducer according to claim 1, wherein the first additional gear meshes with the output gear and the second stage of teeth, the second additional gear meshes with the output gear and the fourth stage of teeth, and the first additional gear and the second additional gear are disposed at two symmetrical positions with respect to a plane orthogonal to a plane formed by axes of rotation of the first intermediate and the second intermediate shafts at equal distance therefrom, and between the first intermediate and the second intermediate shafts.

6. A turbomachine, comprising the speed reducer according to claim 1.

7. The speed reducer according to claim 1, wherein the first additional gear meshes with the input gear and the first stage of teeth, the second additional gear meshes with the input gear and the third stage of teeth, and the first additional gear and the second additional gear are disposed at two symmetrical positions with respect to a plane orthogonal to a plane formed by axes of rotation of the first intermediate and the second intermediate shafts, at equal distance therefrom.

8. The speed reducer according to claim 1, wherein the first additional gear meshes with the output gear and the second stage of teeth, the second additional gear meshes with the output gear and the fourth stage of teeth, and the first additional gear and the second additional gear are disposed at two symmetrical positions with respect to a plane orthogonal to a plane formed by axes of rotation of the first intermediate and the second intermediate shafts at equal distance therefrom, and on either side of the intermediate shafts.

9. The speed reducer according to claim 1, wherein the first stage of teeth has an axial position strictly located between axial positions of the input gear and the output gear, the first additional gear meshes with the input gear and the first stage of teeth, the second additional gear meshes with the input gear and the third stage of teeth, and the first additional gear and the second additional gear are disposed at two diametrically opposite positions with respect to an axis of rotation of the input gear.

10. The speed reducer according to claim 1, wherein the first stage of teeth has an axial position strictly located between axial positions of the input gear and the output gear, the first additional gear meshes with the input gear and the first stage of teeth, the second additional gear meshes with the input gear and the third stage of teeth, and the first additional gear and the second additional gear are disposed at two symmetrical positions with respect to a plane orthogonal to a plane formed by axes of rotation of the first intermediate shaft and the second intermediate shaft, at an equal distance therefrom.

11. The speed reducer according to claim 1, wherein the input gear has an axial position strictly located between axial positions of the first stage of teeth and the second stage of teeth, wherein the first additional gear meshes with the input gear and the first stage of teeth, the second additional gear meshes with the input gear and the third stage of teeth, and the first additional gear and the second additional gear are disposed at two diametrically opposite positions with respect to an axis of rotation of the input gear.

12. The speed reducer according to claim 1, wherein the input gear has an axial position strictly located between axial positions of the first stage of teeth and the second stage of teeth, the first additional gear meshes with the input gear and the first stage of teeth, the second additional gear meshes with the input gear and the third stage of teeth, and the first additional gear and the second additional gear are disposed at two symmetrical positions with respect to a plane orthogonal to a plane formed by axes of rotation of the first intermediate shaft and the second intermediate shaft, at an equal distance therefrom.

13. The speed reducer according to claim 1, wherein the second stage of teeth has an axial position strictly located between axial positions of the input gear and the output gear, the first additional gear meshes with the output gear and the second stage of teeth, the second additional gear meshes with the output gear and the fourth stage of teeth, the first additional gear and the second additional gear are disposed at two symmetrical positions with respect to a plane orthogonal to a plane formed by axes of rotation of the first intermediate shaft and the second intermediate shaft at an equal distance therefrom, and the first additional gear and the second additional gear positioned between the first intermediate shaft and the second intermediate shaft.

14. The speed reducer according to claim 1, wherein the second stage of teeth of the first intermediate shaft that meshes with the first additional gear has an axial position strictly located between axial positions of the input gear and the output gear and wherein the first additional gear meshes with the output gear and the second stage of teeth, the second additional gear meshes with the output gear and the fourth stage of teeth, and the first additional gear and the second additional gear are disposed at two symmetrical positions with respect to a plane orthogonal to a plane formed by axes of rotation of the first intermediate shaft and the second intermediate shaft at equal distance therefrom, the first intermediate shaft and the second intermediate shaft positioned between the first additional gear and the second additional gear.

15. The speed reducer according to claim 1, wherein the output gear meshes with the first additional gear and the second additional gear and has an axial position strictly located between axial positions of the first stage of teeth and the second stage of teeth, the first additional gear and the second additional gear are disposed at two symmetrical positions with respect to a plane orthogonal to a plane formed by axes of rotation of the first intermediate shaft and the second intermediate shaft at an equal distance therefrom, and the first additional gear and the second additional gear are positioned between the first intermediate shaft and the second intermediate shaft.

16. The speed reducer according to claim 1, wherein the output gear meshes with the first additional gear and the second additional gear and has an axial position strictly located between axial positions of the first stage of teeth and the second stage of teeth, and wherein the first additional gear and the second additional gear are disposed at two symmetrical positions with respect to a plane orthogonal to a plane formed by axes of rotation of the first intermediate shaft and the second intermediate shaft at an equal distance therefrom, the first intermediate shaft and the second intermediate shaft positioned between the first additional gear and the second additional gear.

17. The speed reducer according to claim 1, wherein the first additional gear is a single gear directly meshing with the first stage of teeth and the input gear and the second additional gear is a single gear directly meshing with the third stage of teeth and the input gear.

18. The speed reducer according to claim 1, wherein the first additional gear is a single gear directly meshing with the second stage of teeth and the output gear and the second additional gear is a single gear directly meshing with the fourth stage of teeth and the output gear.

\* \* \* \* \*

UNITED STATES PATENT AND TRADEMARK OFFICE
CERTIFICATE OF CORRECTION

PATENT NO. : 10,816,060 B2  
APPLICATION NO. : 15/998612  
DATED : October 27, 2020  
INVENTOR(S) : Benjamin Feraud et al.

Page 1 of 1

It is certified that error appears in the above-identified patent and that said Letters Patent is hereby corrected as shown below:

In the Specification

In Column 5, Line 36, delete "Dear" and insert -- Gear --.

In the Claims

In Column 8, Line 56, Claim 1, delete "near" and insert -- gear --.

In Column 8, Line 57, Claim 1, delete "near" and insert -- gear --.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*